United States Patent
Troeger et al.

(10) Patent No.: US 7,029,052 B2
(45) Date of Patent: Apr. 18, 2006

(54) CONVERTIBLE SOFT TOP FOR A SPORT UTILITY OR SIMILAR VEHICLE

(75) Inventors: Rick H. Troeger, Westminster, CO (US); Joseph C. Jacobucci, Brighton, CO (US); Timothy J. Gile, Loveland, CO (US); Bryan Early, Brighton, CO (US); James A. Robertson, Thornton, CO (US); Frank Ells, Westminster, CO (US)

(73) Assignee: Bestop, Inc., Broomfield, CO (US)

( * ) Notice: Subject to any disclaimer, the term of this patent is extended or adjusted under 35 U.S.C. 154(b) by 0 days.

(21) Appl. No.: 10/804,716

(22) Filed: Mar. 19, 2004

(65) Prior Publication Data

US 2005/0206197 A1    Sep. 22, 2005

(51) Int. Cl.
*B60J 7/12* (2006.01)
(52) U.S. Cl. .................................. 296/107.19
(58) Field of Classification Search ........... 296/107.19, 296/107.1, 108, 109, 114, 107.11, 107.15, 296/210, 216.01, 219, 216.02, 216.03, 216.06, 296/216.09
See application file for complete search history.

(56) References Cited

U.S. PATENT DOCUMENTS

| | | | | | |
|---|---|---|---|---|---|
| 513,578 | A | * | 1/1894 | Kierolf | 296/111 |
| 822,634 | A | * | 6/1906 | Shipley | 296/114 |
| 876,768 | A | * | 1/1908 | Bowen | 296/114 |
| 960,832 | A | * | 6/1910 | Cree | 296/114 |
| 1,188,402 | A | * | 6/1916 | Bonner | 296/114 |
| 1,332,418 | A | * | 3/1920 | Stewart | 296/116 |
| 3,348,877 | A | * | 10/1967 | Caramanna | 135/88.09 |
| 4,066,292 | A | * | 1/1978 | Carli | 296/219 |
| 5,284,378 | A | * | 2/1994 | Sautter, Jr. | 296/224 |
| 5,299,850 | A | * | 4/1994 | Kaneko et al. | 296/107.13 |
| 5,435,615 | A | * | 7/1995 | Schmitz | 296/121 |
| 5,673,959 | A | | 10/1997 | Padlo | |
| 5,947,546 | A | | 9/1999 | Hilliard et al. | |
| 5,992,917 | A | * | 11/1999 | Hilliard et al. | 296/103 |
| 6,033,009 | A | * | 3/2000 | Ritter et al. | 296/121 |
| 6,036,254 | A | * | 3/2000 | Ritter et al. | 296/103 |
| 6,068,326 | A | * | 5/2000 | Shiromura | 296/120.1 |
| 6,206,450 | B1 | * | 3/2001 | Ide et al. | 296/107.09 |
| 6,270,145 | B1 | * | 8/2001 | Kamo et al. | 296/121 |
| 6,295,713 | B1 | * | 10/2001 | Hilliard et al. | 29/446 |

(Continued)

OTHER PUBLICATIONS

BESTOP INC., Supertop Sunrider Installation Instructions, pp. 1-17, 0897 Rev. C, 1997.

*Primary Examiner*—H. Gutman
(74) *Attorney, Agent, or Firm*—W. Scott Carson

(57) ABSTRACT

A convertible soft top for a vehicle includes a foldable, collapsible frame and a fabric attached to it. The frame has front and rear bow members with the rear bow member mounted for rotation about a first, fixed axis. The front bow member is pivotally mounted to the side legs of the rear bow member for movement about a second axis spaced from the first axis. The front bow member can be moved with the rear bow member about the fixed axis and also pivotally moved relative to the rear bow member about the second axis. Other features of the top include a sunroof and supporting structure to facilitate its operation and an arrangement to automatically secure the front bow member to the vehicle door frame as the top is moved to its raised position.

48 Claims, 12 Drawing Sheets

U.S. PATENT DOCUMENTS

| | | | |
|---|---|---|---|
| 6,409,248 B1 * | 6/2002 | Bores | 296/122 |
| 6,431,635 B1 * | 8/2002 | Nicastri | 296/107.09 |
| 6,439,643 B1 | 8/2002 | Barker | |
| 6,520,560 B1 * | 2/2003 | Schutt et al. | 296/121 |
| 6,755,457 B1 * | 6/2004 | Grubbs | 296/107.09 |
| 6,866,322 B1 * | 3/2005 | Willard | 296/107.01 |

* cited by examiner

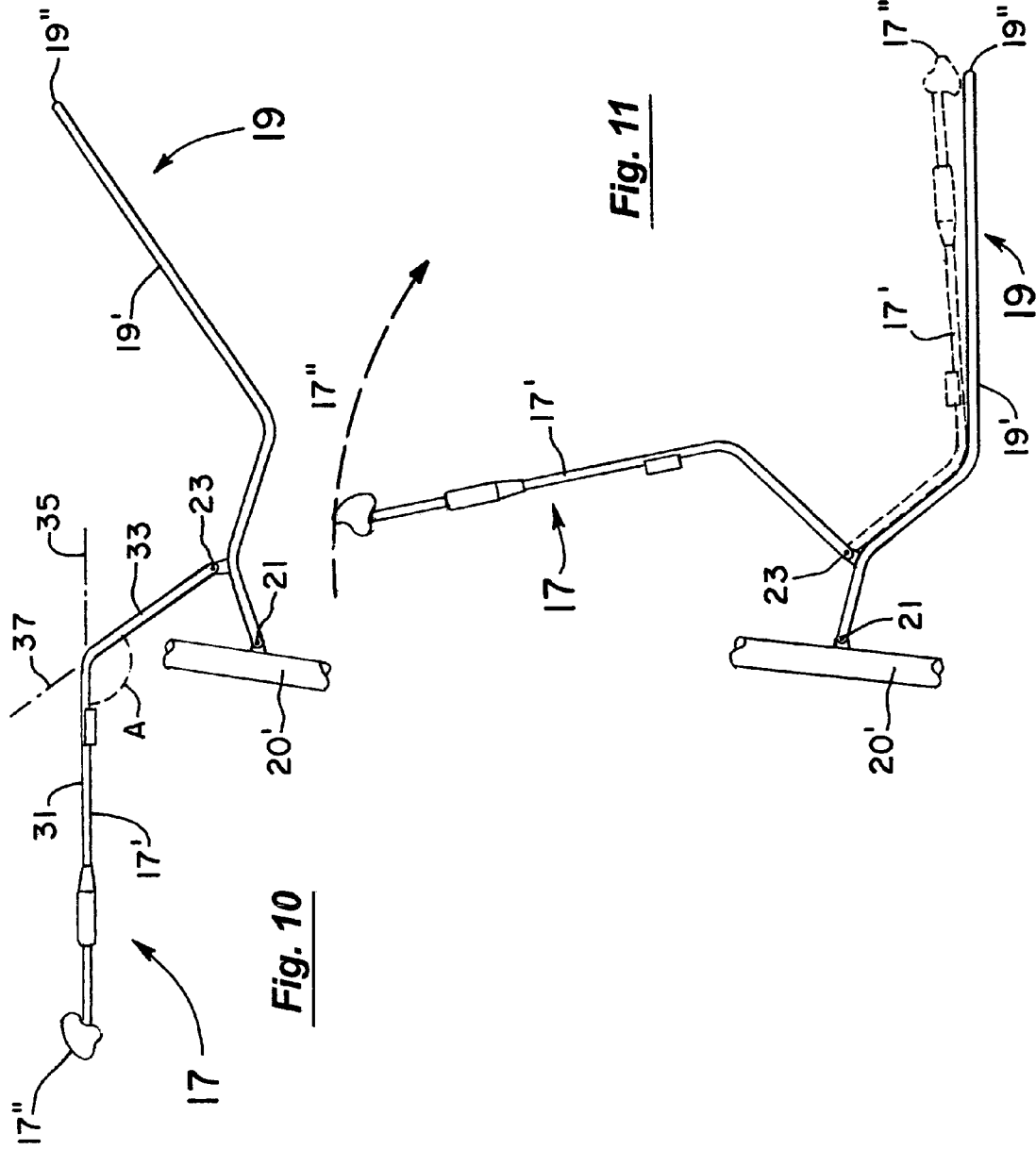

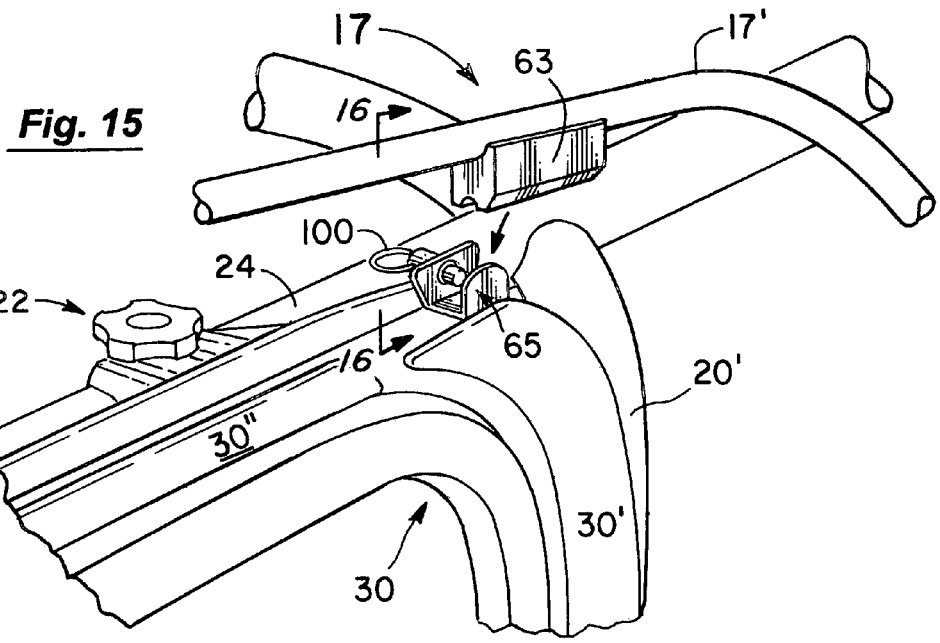
*Fig. 15*
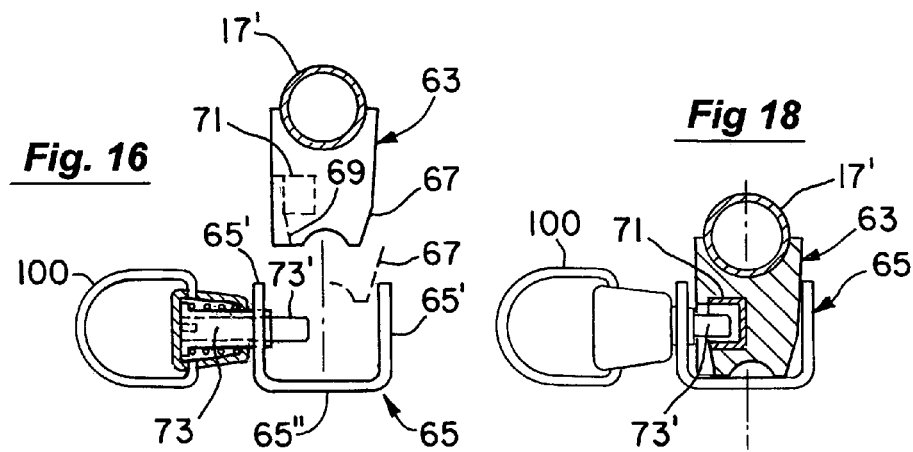
*Fig. 16*
*Fig 18*
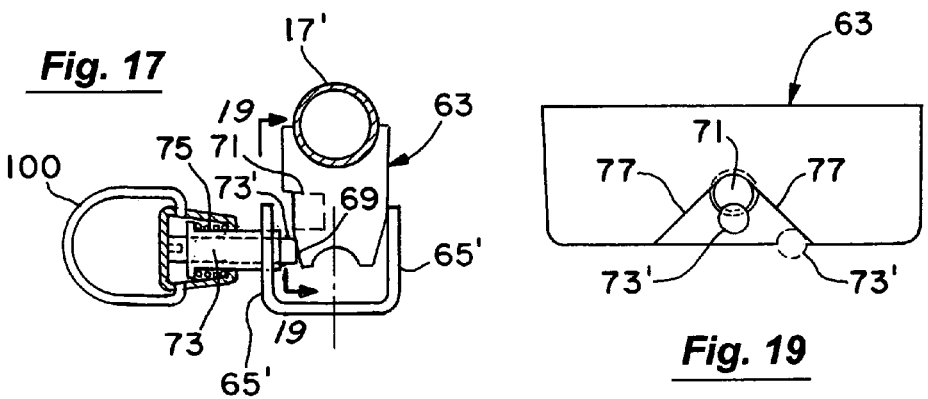
*Fig. 17*
*Fig. 19*

CONVERTIBLE SOFT TOP FOR A SPORT UTILITY OR SIMILAR VEHICLE

BACKGROUND OF THE INVENTION

1. Field of the Invention

This invention relates to the field of convertible soft tops for sport utility and similar vehicles.

2. Discussion of the Background

Convertible soft tops are very popular with owners of sport utility and similar vehicles. Among other things, they offer the owner the option of being able to lower the top for an open air experience or raise it to be covered and protected from the elements. In doing so, it is important that the design of the top be easy and convenient to operate. This is particularly desirable as the change from the lowered or collapsed position to the raised or covered position often must be made fairly quickly and many times in inclement weather. It is also desirable that the top including its frame occupy as little space as possible in its lowered or collapsed position.

With this and other ideas in mind, the present invention was developed. In it, a convertible soft top is provided that can be easily and quickly moved between its raised and lowered positions. Additionally, the basic design of the foldable and collapsible frame permits it to be adapted for use with extended length vehicles. In such vehicles, the rear portion or deck of the basic vehicle design is extended to create more space yet the front end as well as the driver and front passenger areas and much of the other structure and dimensions often remain essentially the same. Consequently, the frame of the convertible top and in particular the front bow often cannot simply be designed to pivot about an axis midway between its raised and lowered positions. Rather, as in the present invention, a more sophisticated arrangement for the pivotal axis is necessary. Other features of the present invention also include the addition of a sunroof to the convertible soft top and supporting structure to facilitate its safe and efficient operation between open and closed positions.

SUMMARY OF THE INVENTION

This invention involves a convertible soft top for a sport utility vehicle. The top includes a foldable, collapsible frame and a fabric attached to it. The top is movable between a raised position covering or enclosing the rear of the vehicle as well as the area of the driver and front passenger and a lowered or collapsed position. The frame has front and rear bow members with the rear bow member mounted for rotation about a first, fixed axis. The front bow member in turn is pivotally mounted to the side legs of the rear bow member for movement about a second axis spaced from the first axis.

In use, the rear bow member can be pivotally moved about the fixed axis to a collapsed position. Additionally, the front bow member can be moved with the rear bow member about the fixed axis and also pivotally moved relative to the rear bow member about the second axis. In doing so, the base of the front bow member can be moved rearwardly in the collapsed position for a distance greater than it extends forwardly in its raised position.

The top in this regard is particularly appropriate for use with extended length vehicles. In such vehicles and unlike current designs, the pivotal axis of the front bow member does not have to be exactly midway between the collapsed and raised positions. Rather, the pivotal axis of the front bow member moves or floats in a controlled manner rearwardly as the top is lowered. Consequently, the length of the rear portion of the vehicle can be extended as desired for additional rear passenger or storage space and the convertible soft top of the present invention used to cover it.

Other features of the present invention also include the addition of a sunroof to the convertible soft top and supporting structure to facilitate its safe and efficient operation between open and closed positions. An improved clamp assembly is further included to selectively secure the soft top to the vehicle windshield and to the base of the front bow member when the sunroof is open. In this manner, the clamp assembly will be secured in a fixed position when the sunroof is open and will not rattle or undesirably hang down into the area of the driver and front passenger. Still other features of the present invention include an additional bow member pivotally mounted to the rear bow member, an arrangement to positively lock the sunroof in a lowered or closed position, and an arrangement to automatically secure the front bow member to the vehicle door frame as the top is moved from its collapsed position to its raised position.

BRIEF DESCRIPTION OF THE DRAWINGS

FIGS. 10 and 11 are schematic views of the front and rear bow members of the frame of the top as they are moved from their raised positions to their lowered or collapsed positions.

FIG. 15 is a perspective view of the front bow member and the arrangement for automatically securing it to the door frame of the vehicle body.

FIG. 16 is a view taken along line 16—16 of FIG. 15.

FIGS. 17 and 18 are sequential views of the front bow member and attached block member being lowered from the position of FIG. 16 to the locked or secured position of FIG. 18.

FIG. 19 is a view taken along line 19—19 of FIG. 17.

DETAILED DESCRIPTION OF THE INVENTION

Figure 1:
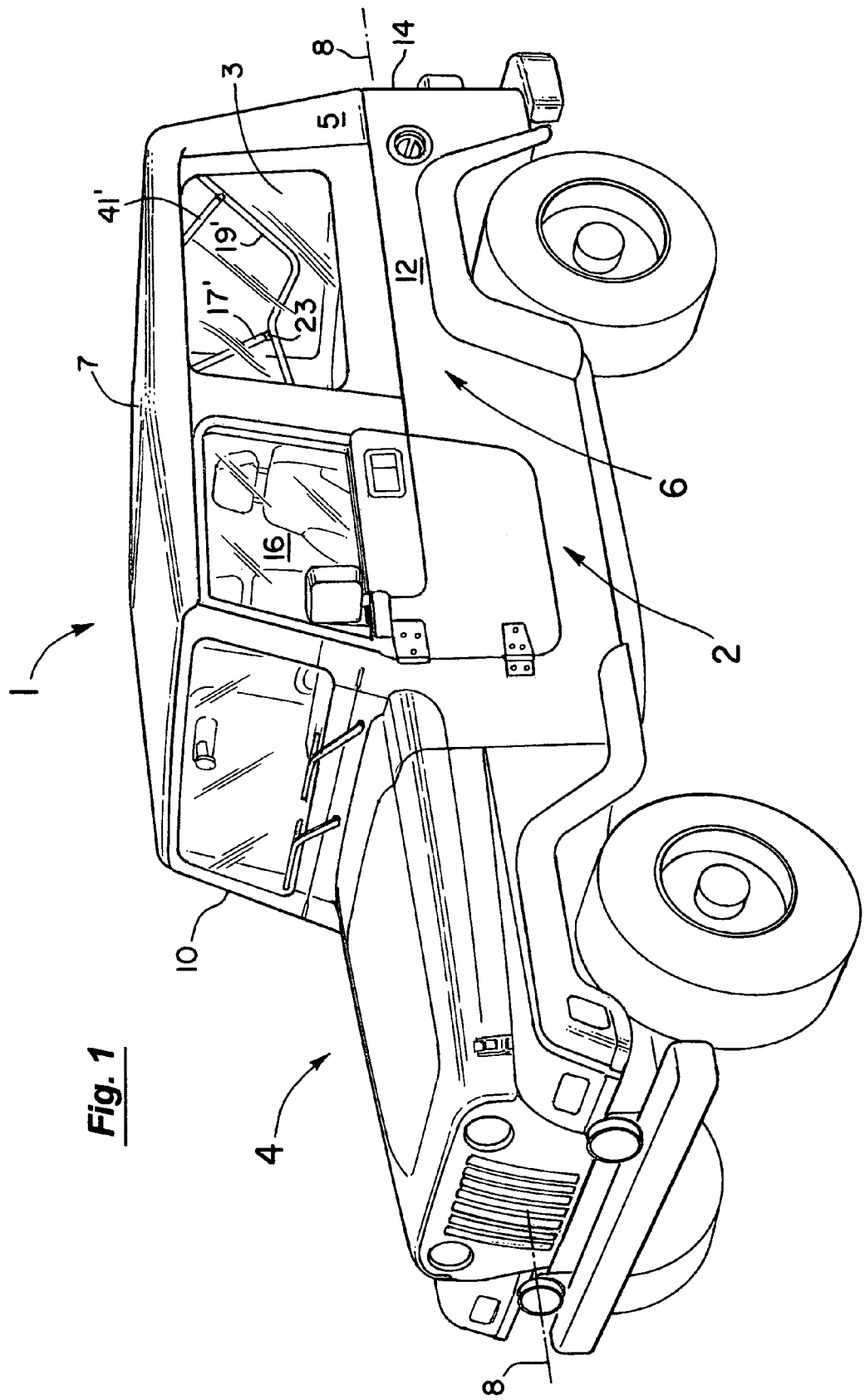
FIG. 1 is a perspective view of a sport utility vehicle with the convertible soft top of the present invention in its raised position.
Figure 6:
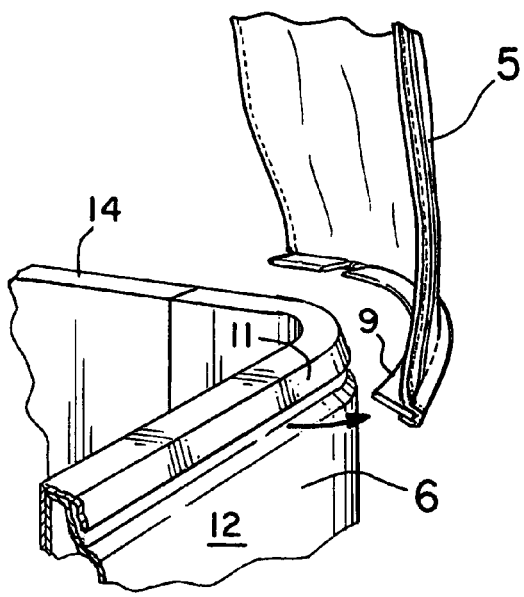
FIG. 6 is a perspective view of the rear section of the top disengaged from the vehicle body.

As shown in FIG. 1, the present invention is directed to a convertible soft top 1 for a sport utility or similar vehicle 2. The vehicle 2 has a body with front and rear portions 4 and 6 spaced from each other along the longitudinal axis 8. The front portion 4 (see also FIGS. 2–4) has an upstanding windshield 10 and the rear portion 6 includes side panels 12 and rearward panel 14 (see also FIG. 6).

Figure 2:
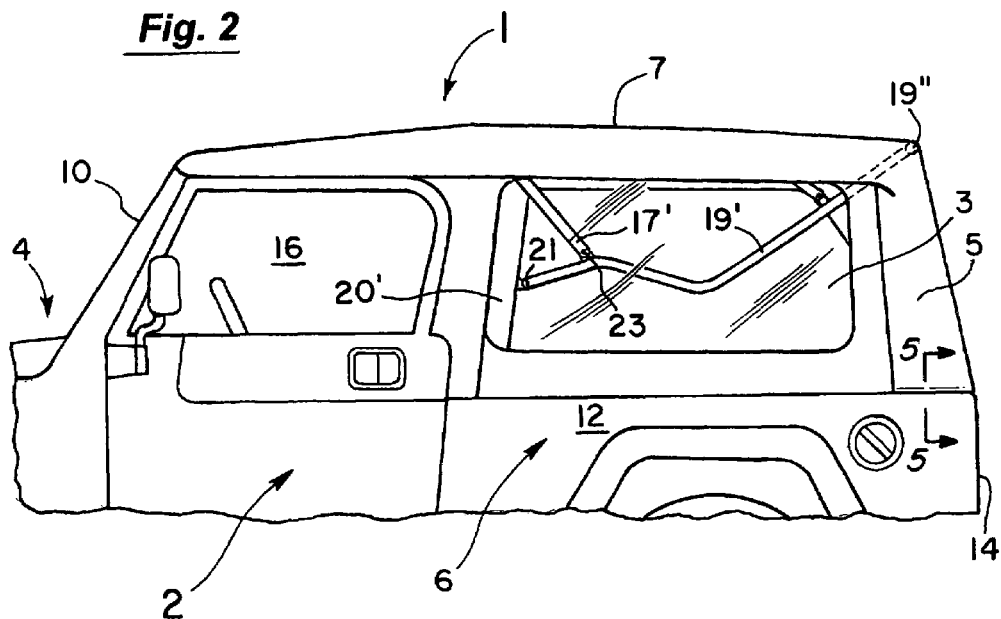
FIG. 2 is a side elevational view of the raised soft top.
Figure 3:
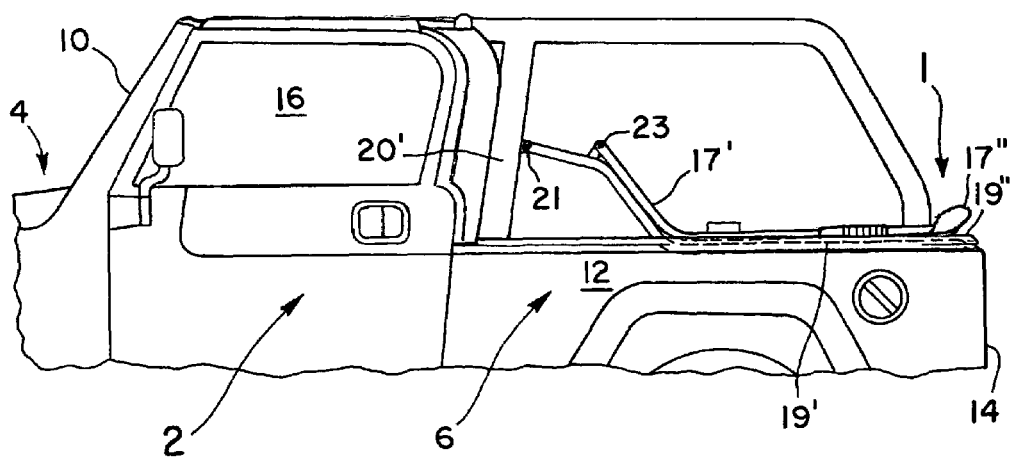
FIG. 3 is a side elevational view of the convertible soft top in its lowered or collapsed position.
Figure 4:
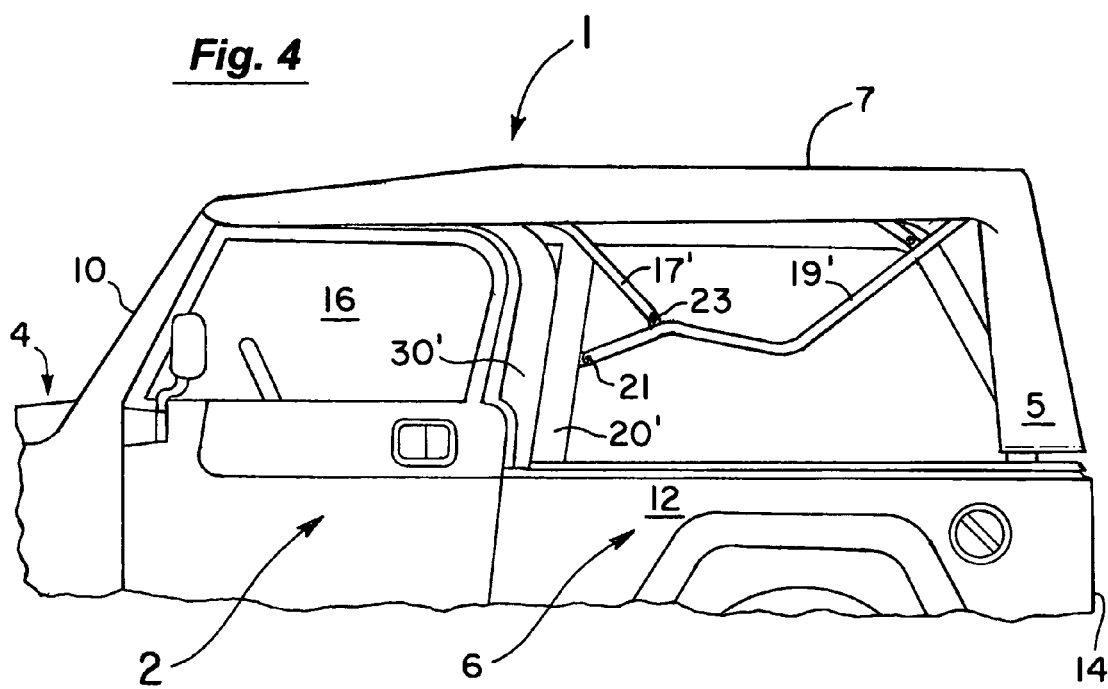
FIG. 4 is a side elevational view of the soft top with the rear quarter window removed and the rear section of the top disengaged from the vehicle body.
Figure 5:
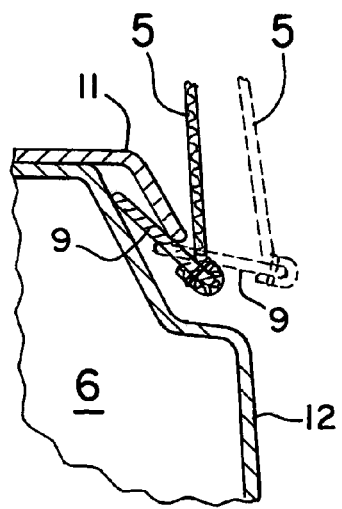
FIG. 5 is a view taken along line 5—5 of FIG. 2 showing one manner in which the fabric of the top can be removably secured to the vehicle body.

The convertible soft top 1 as best seen in FIGS. 2 and 3 is movable between a raised position (FIG. 2) and a lowered or collapsed position (FIG. 3). In the raised position of FIG. 2, the top 1 covers or encloses the rear portion 6 of the vehicle body as well as the area 16 of the driver and front passenger. In lowering or collapsing the top 1, the rear quarter window 3 of the top 1 in FIG. 2 is preferably first removed as in FIG. 4. The rear section 5 of the fabric 7 of the top 1 is also preferably disengaged (FIGS. 5 and 6) from the rear portion 6 of the vehicle body. The fabric rear section 5 of the top 1 in this regard can be releasably secured to the rear portion 6 of the vehicle body in any number of ways. In the illustrated one of FIGS. 5 and 6, the lower edge of the fabric rear section 5 is provided with a belt 9 that is releasably securable in a channel member 11 in the known manner of U.S. Pat. Nos. 4,757,854 and 5,947,546. With the rear quarter window 3 removed and the fabric rear section 5 disengaged from the rear portion 6 of the vehicle body as in FIGS. 4 and 6, the convertible soft top 1 can then be folded from the raised position of FIG. 2 to the collapsed position of FIG. 3.

Figure 7:
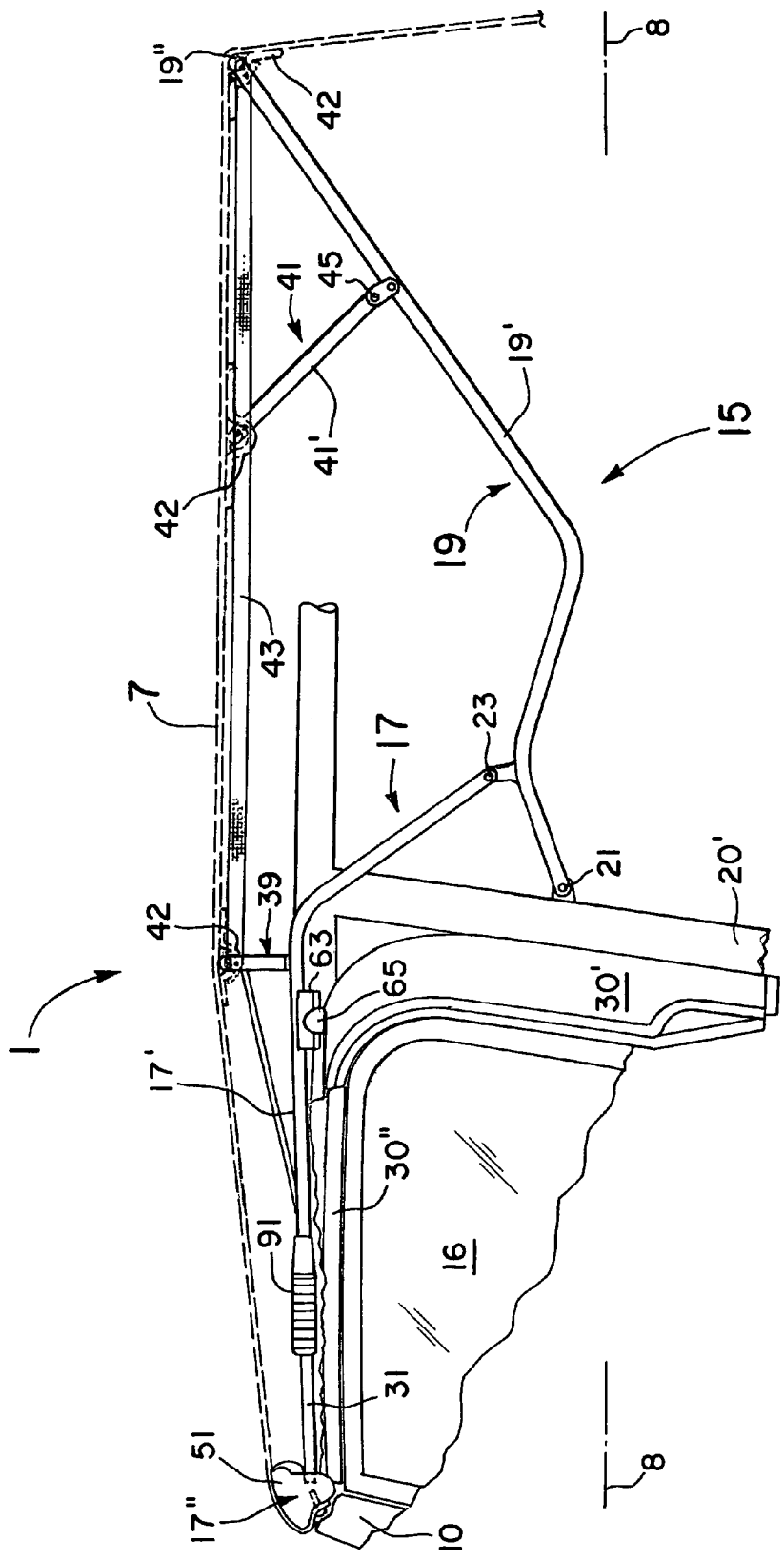
FIG. 7 is a side elevational view of the frame of the top in its raised position.

More specifically and as best seen in FIGS. 1–4 and 7, the convertible soft top 1 of the present invention has a flexible fabric 7 (e.g., vinyl or canvas) that is mounted and supported on a foldable, collapsible frame 15 (see FIG. 7). The frame 15 as shown has a number of pieces including front and rear bow members 17 and 19 (see also FIG. 8). Each bow member 17, 19 has an inverted, substantially U-shape (FIG. 8) with the respective side legs 17',19' of each U-shape and the base 17",19" of each U-shape extending substantially horizontally between the respective side legs 17' and 19'.

Figure 8:
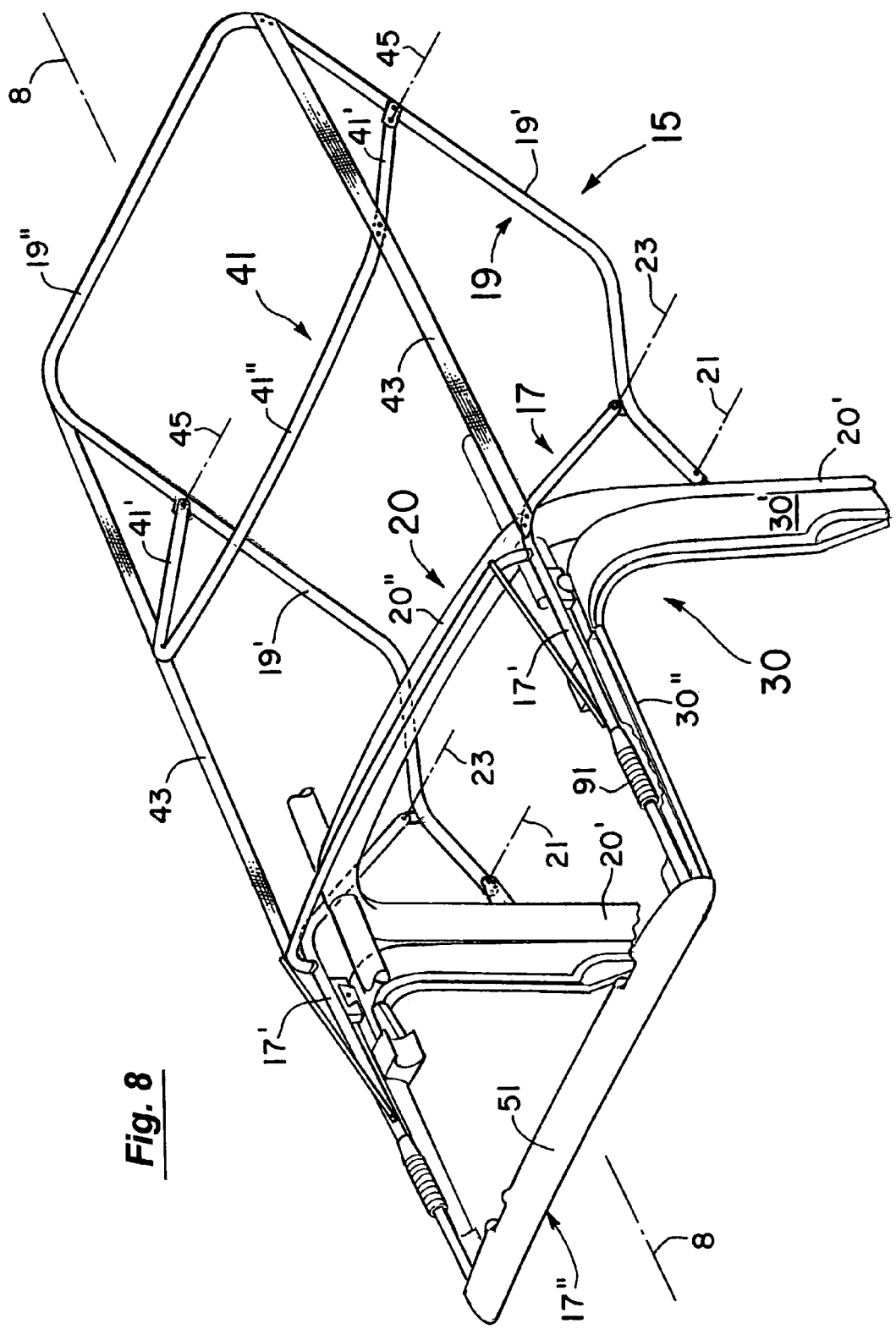
FIG. 8 is a perspective view of the frame of FIG. 7.

The side legs 19' of the rear bow member 19 as illustrated in FIGS. 7 and 8 are respectively mounted to the legs 20' of the portion 20 of the safety bar arrangement or cage of the vehicle 2. This portion 20 of the safety bar arrangement as best seen in FIG. 8 has an inverted, substantially U-shape with the side legs 20' of the U-shape extending substantially vertically upwardly from the vehicle body (see also FIG. 4). The base 20" of the U-shape in FIG. 8 like the bases 17" and 19" of the front and rear bows 17 and 19 then extends between the side legs 20' substantially horizontally across the vehicle body and longitudinal axis 8.

Figure 9:
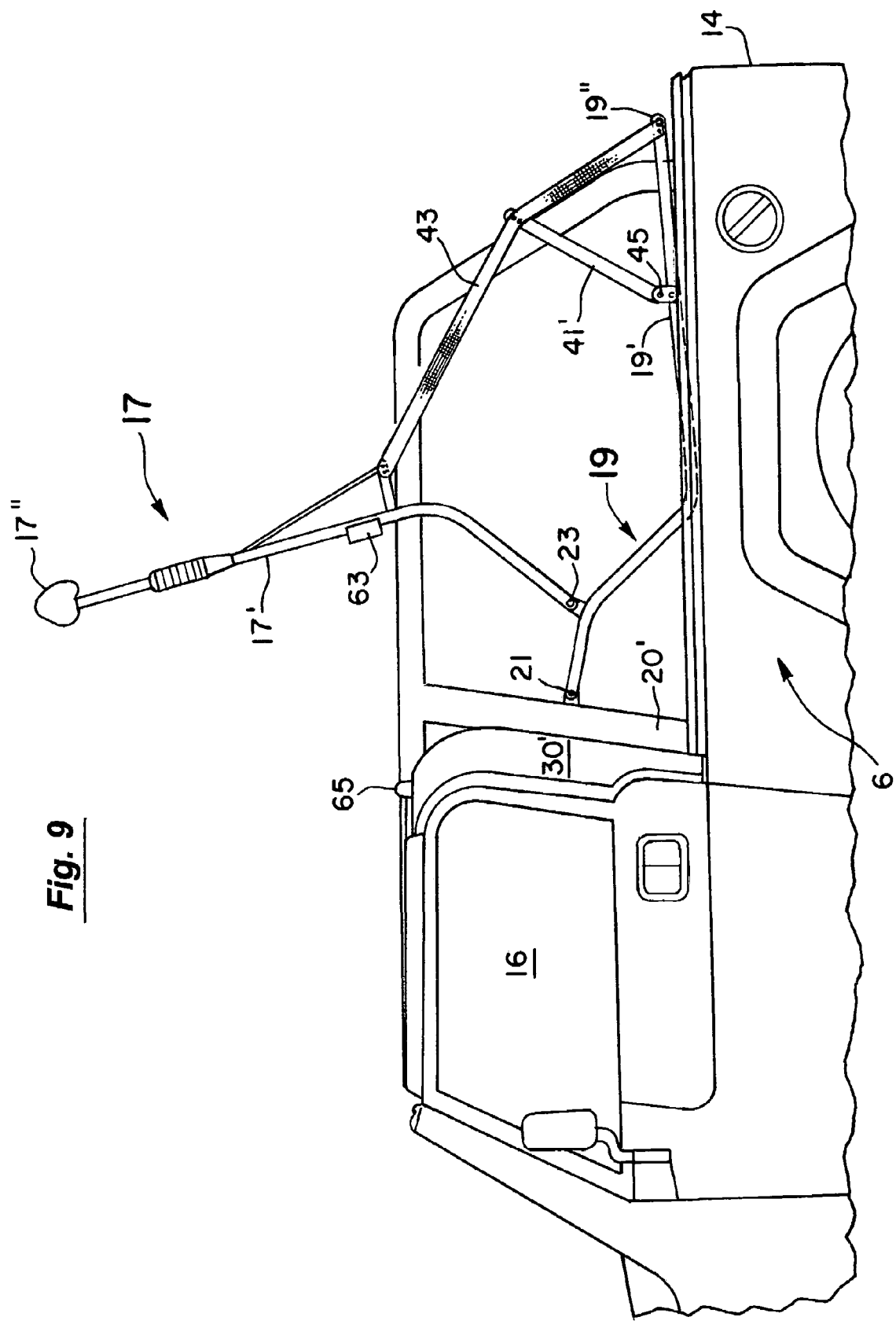
FIG. 9 is a side elevational view of the frame of the top in a position between its raised and lowered positions.

In operation as indicated above, the convertible soft top 1 can be moved from the raised position of FIG. 2 to the lowered or collapsed portion of FIG. 3. In doing so, the rear bow member 19 pivots about the fixed axis 21 (see FIGS. 7–9) relative to the side legs 20' of the safety bar portion 20. This movement is continued until the base 19" of the rear bow member 19 (FIG. 9) is positioned adjacent the rearward panel 14 of the rear portion 6 of the vehicle body. The front bow member 17 in turn is pivotally moved with the rear bow member 19 about the fixed axis 21 and also pivotally moved relative to the rear bow member 19 about the axis 23 (FIG. 9). The axis 23 in this regard as shown in FIGS. 7 and 8 is spaced from and substantially parallel to the fixed axis 21 of the rear bow member 19. Consequently, in moving from the raised position of FIGS. 7 and 8 to the halfway position of FIG. 9 and on to the collapsed position of FIG. 3, the front bow member 17 pivots both about the fixed axis 21 relative to the safety bar portion 20 and about the axis 23 relative to the rear bow member 19. In doing so, the base 17" of the front bow member 17 in FIG. 7 is then moved from being adjacent the windshield 10 of the vehicle 2 in the raised position of FIG. 7 to being adjacent the rearward panel 14 and base 19" of the rear bow member 19 in the collapsed position of FIG. 3.

Figure 12:
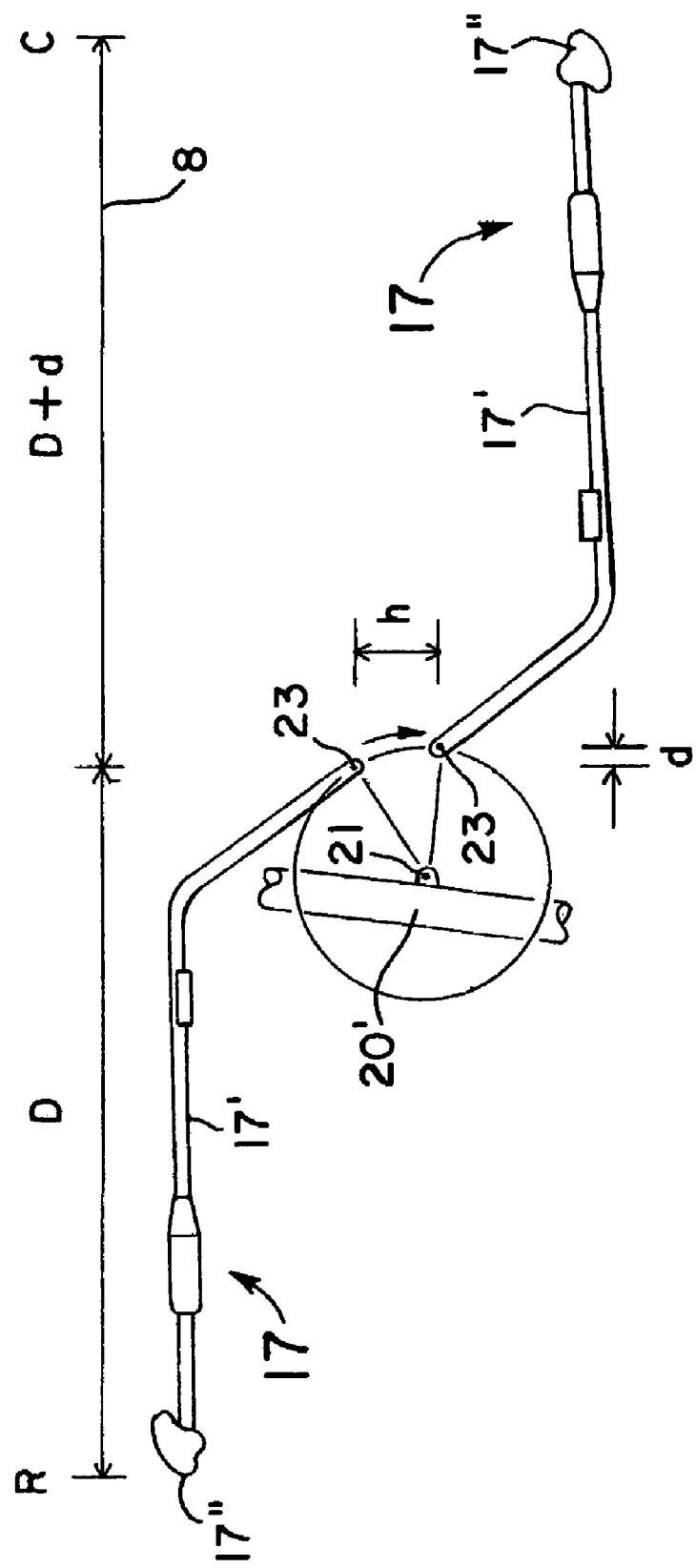
FIG. 12 is an isolated, schematic view of the movement of the front bow member from its raised postion to its lowered or collapsed position.

The arrangement of the fixed pivotal axis 21 of the rear bow member 19 on the safety bar side legs 20' and the pivotal axis 23 of the front bow member 17 (which is fixed relative to the rear bow member 19 but floats or moves about the axis 21) creates a unique feature of the convertible soft top 1 of the present invention. More specifically and as best seen in the schematic illustrations of FIG. 10–12, this arrangement permits the base 17" of the front bow member 17 to be moved rearwardly along the longitudinal axis 8 of FIG. 12 for a distance (D+d) greater than the distance (D) the front bow member extends forwardly in the raised position (R). That is, in the raised position (R) of FIG. 12, the front bow member 17 extends a distance (D) along the axis 8. However, in going to the collapsed position (C), the base 17" of the front bow member 17 actually moves rearwardly a distance (D+d). The difference (d) as best seen in FIG. 12 is due to the arcuate movement of the pivotal axis 23 of the front bow member 17 about the fixed axis 21. This movement as shown both lowers the axis 23 at h and moves the axis 23 rearwardly at d. With this arrangement and unlike current designs with a fixed pivot for the front bow member 17 with the pivot positioned halfway between the points R and C, the base 17" and side legs 17' of the front bow member 17 now have more flexibility in their design. In particular, the distance (D) of FIG. 12 no longer needs to be exactly half of the distance between points R and C along the axis 8.

Figure 13:
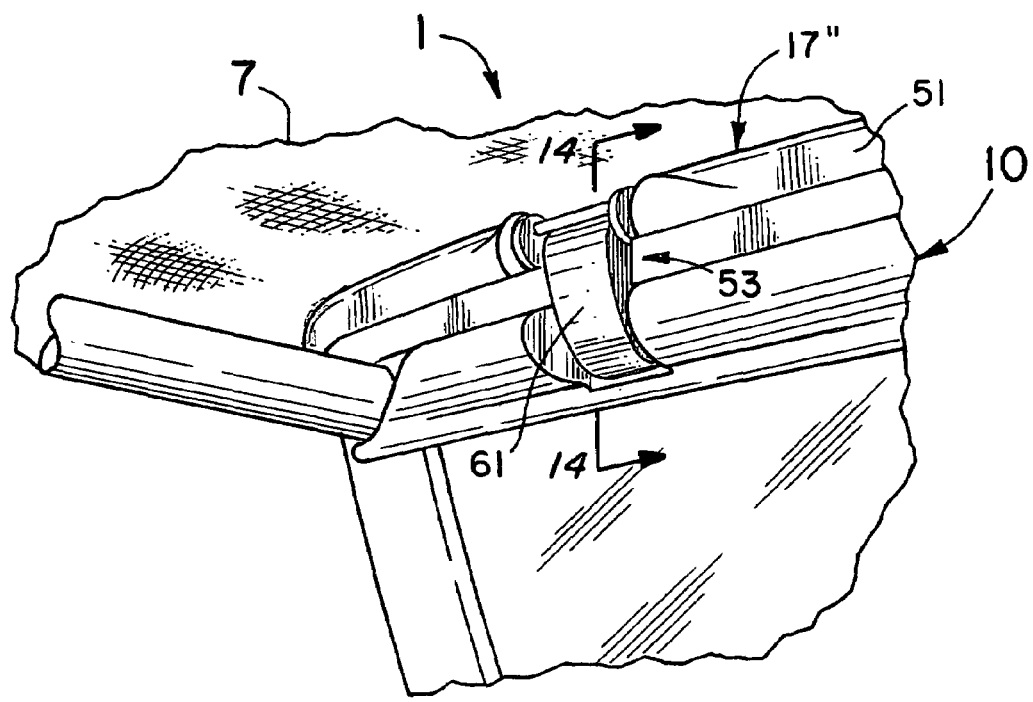
FIG. 13 is a perspective view of one of the clamp assemblies for releasably securing the header of the front bow member to the windshield.
Figure 14:
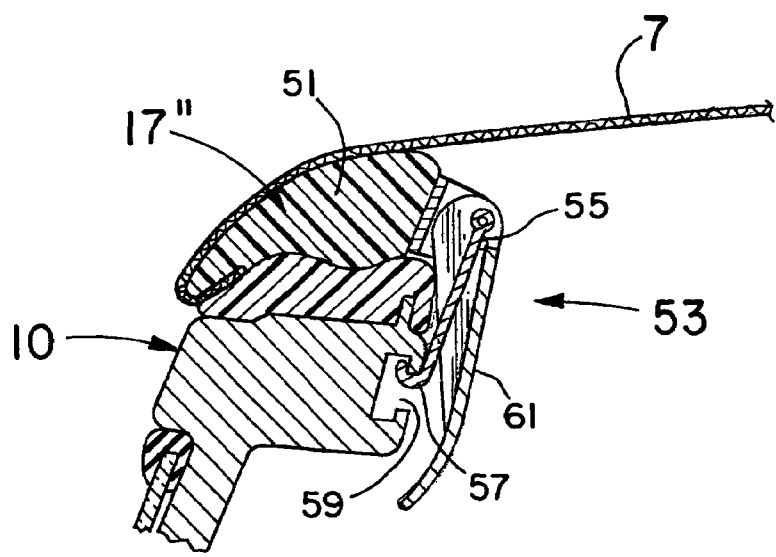
FIG. 14 is a view taken along line 14—14 of FIG. 13.

One immediate benefit is that the rear portion 6 of the vehicle body can be extended or lengthened without affecting how the front bow member 17 fundamentally fits and operates over the door frame 30 in FIG. 8. It also does not affect how the front bow member 17 releasably secures or clamps to the windshield 10 (FIGS. 13 and 14). That is, the convertible soft top 1 of the present invention can essentially be adapted for use with vehicles with rear portions 6 of different lengths. Further, this can be done without requiring any significant changes to the design and dimensions of the vehicle forward of the safety bar portion 20 and the vertical section 30' of the door frame 30. Importantly, this means no fundamental changes are needed to previously designed and dimensioned areas such as 16 for the driver and front passenger or the door frame 30. Changes could certainly be made to such vehicles forward of the safety bar portion 20 and door frame section 30' and the convertible soft top 1 of the present invention modified to fit them. However, by the same token, such changes need not be made yet the convertible soft top 1 of the present invention can accommodate extensions to the rear portion 6 of the vehicle body for additional seating or storage space. This feature of the convertible soft top 1 of the present invention can be particularly advantageous in different models of the same vehicle line. In this manner, the design of the vehicle forward of the safety bar portion 20 and door frame section 30' can remain essentially the same from model to model yet varying or extended lengths of the rear portion 6 can also be offered.

Referring again to FIGS. 10 and 11, each side leg 17' of the front bow member 17 is preferably substantially L-shaped and corresponding side leg 19' of the rear bow member 19 preferably has a substantially matching L-shaped portion as shown. Consequently, in the collapsed position of FIG. 3 and as illustrated in dotted lines in FIG. 11, each L-shaped side leg 17' of the front bow member 17 and each L-shaped portion of the side legs 19' of the rear bow member substantially align adjacent one another in a neat and compact manner. The sections 31 and 33 (FIG. 10) of the L-shaped side legs 17' in this regard extend along respective axes 35 and 37 that preferably intersect at an angle A greater than 90 degrees (e.g., 120 degrees). This and the floating pivotal axis 23 both aid in allowing the front bow member 17 to be adaptable to extended length vehicles.

The flexible fabric 7 of the convertible soft top 1 as indicated above is attached to the frame 15. As best seen in FIG. 7, the fabric 7 can be attached to the base 17" of the front bow member 17 and to the base 19" of the rear bow member 19. The fabric 7 can also be attached to the additional, intermediate bow members 39 and 41 if desired (e.g., by overlapping flaps 42 with hook and loop fasteners, snaps, or screws). Flexible connecting straps 43 as in FIGS. 7–9 are also preferably attached between the bow members 39, 41, and 19 to aid in positioning these bow members in the raised position of FIG. 7. In this raised position of FIG. 7, the base 17" of the front bow member 17 is adjacent the windshield 10 as previously discussed and the base 19" of the rear bow member 19 (see also FIG. 2) is spaced from and above the rearward panel 14 of the rear portion 6 of the vehicle body.

In designing the convertible soft top 1 of the present invention for use with extended length vehicles, the additional bow member 41 of FIG. 7 was included to better support the extended length of the fabric 7 of the top 1. As shown in FIGS. 7 and 8, this additional bow member 41 like bow members 17 and 19 has an inverted, U-shape with side legs 41' and a horizontally extending base 41". The side legs 41' are respectively mounted to the side legs 19' of the rear bow member 19 for pivotal movement about the axis 45. The axis 45 is substantially parallel to the axes 21 and 23 and fixed relative to axis 23. The axis 45 is also positioned along the respective side legs 19' between the base 19" and the pivotal axis 23. In operation, the additional bow member 41 is movable about the pivotal axis 45 between a collapsed position and raised position. In the collapsed position, the base 41" is adjacent the base 19" of the collapsed rear bow member 19 and in the raised position of FIG. 7, the base 41" is spaced from the base 19" of the rear bow member 19 toward the front portion 4 of the vehicle body.

Referring to FIGS. 13 and 14 and to maintain the base 17" of the front bow member 17 in the raised position, a header section 51 is provided on the base 17" with one or more clamp assemblies 53. Each clamp assembly 53 is mounted to the header section 51 for pivotal movement about an axis 55 (see FIG. 14). In operation, each overcenter hook member 57 of each clamp assembly 53 is selectively receivable in a recess 59 in the windshield 10 (FIG. 14) and securable in place by lowering the clamp handle 61.

As the front bow member 17 is moved from the collapsed position of FIG. 3 to the raised position of FIG. 2, the convertible soft top 1 of the present invention has an arrangement as illustrated in FIGS. 15–19 to automatically secure each side leg 17' of the front bow member 17 to the door frame 30. This arrangement includes a block member 63 mounted on each side leg 17' and a substantially U-shaped member 65. The U-shaped receiving member 65 as illustrated in FIGS. 16 and 17 has two upstanding legs 65' spaced apart from one another and a base 65" extending therebetween. Additionally, the block member 63 has a beveled or inclined surface 67 (FIG. 16). This beveled surface 67 is aligned as indicated in dotted lines in FIG. 16 to contact the one leg 65' on the right side of the U-shaped member 65 if needed as the side legs 17' is moved downwardly. In doing so, the beveled surface 67 of the block member 63 will guide the attached side leg 17' of the front bow member 17 into a position between the legs 65' of the U-shaped receiving member 65. In the preferred embodiment, there is a block member 63 and U-shaped member 65 on each side leg 17' that are mirror images of the pair on the other side leg 17'. Consequently, the respective surfaces 67 on the block members 63 can act together in a self-centering manner to properly align and guide both block members 63 into the respective U-shaped members 65.

Each block member 63 additionally has a second beveled or inclined surface 69 (FIGS. 16 and 17) adjacent the recess or hole 71. In operation as the front bow member 17 is moved to the raised position and the side leg 17' thereof is lowered from the position of FIG. 16 to that of FIG. 17, the second beveled surface 69 will contact the end portion 73' of the plunger 73 extending through the left side leg 65' in FIG. 17 and retract the end portion 73' against the biasing force of the spring 75. Thereafter, the force of the compressed spring 75 will move the end portion 73' of the plunger 73 into the aligned recess 71 in the block member 63 and the locked or secured position of FIG. 18. To further aid in the alignment or automatic guiding of the end portion 73' of the plunger 73 into the recess 71, the block member 63 also has a surface 77 (see FIG. 19) with an inverted, substantially V-shape. Consequently, as the block member 63 is lowered, the plunger end portion 73' if needed will contact the inverted V-shaped surface 77 (as shown in dotted lines in FIG. 19). This in turn will aid in self-centering or guiding the end portion 73' into the recess 71.

Figure 20:
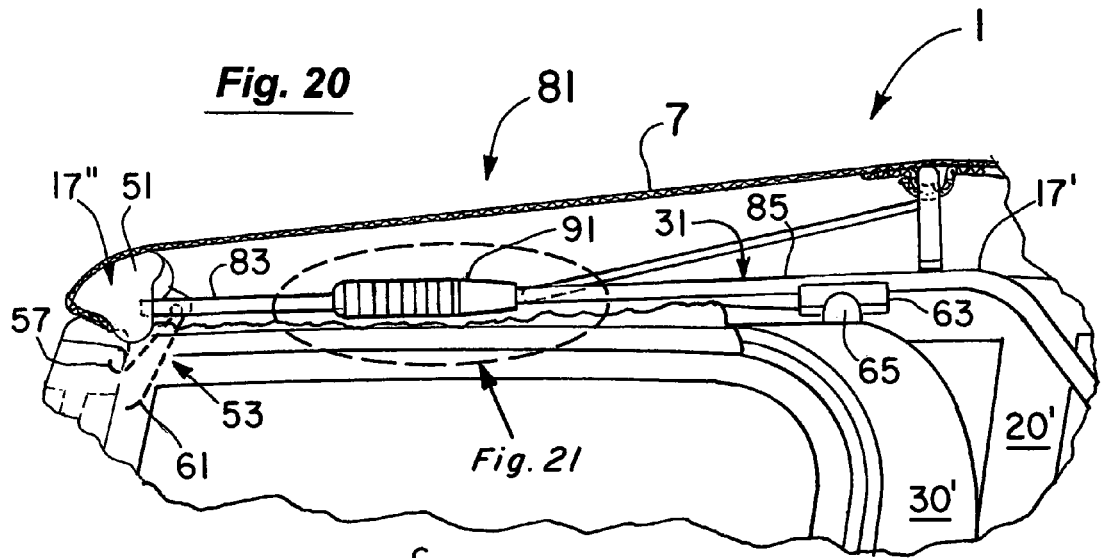
FIG. 20 is a side elevational view of the sunroof portion of the convertible soft top of the present invention.

In this manner and as indicated above, the locking or securing of the plunger end portion 73' in the recess 71 of the block member 63 will then automatically occur as the front bow member 17 is moved from the collapsed position of FIG. 3 to the raised position of FIGS. 2 and 20. To subsequently release the block member 63 from the member 65, the ring 100 of the plunger 73 in FIG. 18 can simply be grasped and pulled to the left against the biasing force of the spring 75. It is noted that in the secured position of FIG. 18, the section 31 (see FIG. 7) of each L-shaped side leg 17' is substantially aligned with the substantially horizontally extending section 30" of the door frame 30. The door frame section 30" as shown in FIG. 7 extends rearwardly from adjacent the windshield 10 to the vertically extending door frame section 30'. Also as illustrated in FIG. 15, the door frame at this section 30" can be removably secured (e.g., clamped) at 22 to the forward extending portion 24 of the safety bar arrangement of the vehicle.

Figure 21:
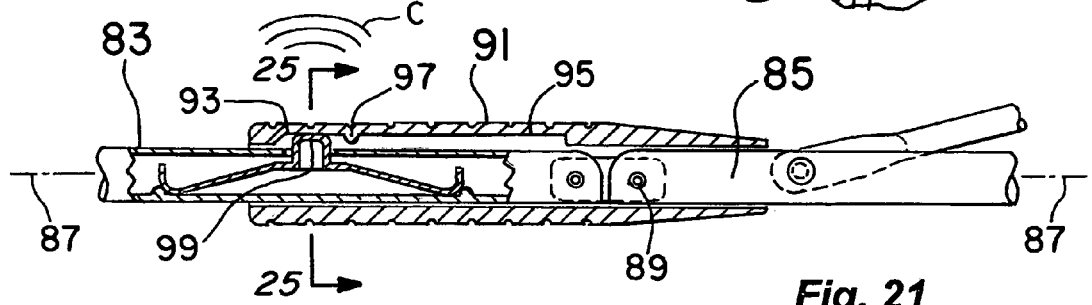
FIGS. 21–23 are enlarged, sequential views of the operation of the locking sleeve member being slid from its locked position of FIG. 21 to its unlocked position of FIG. 23.
Figure 24:
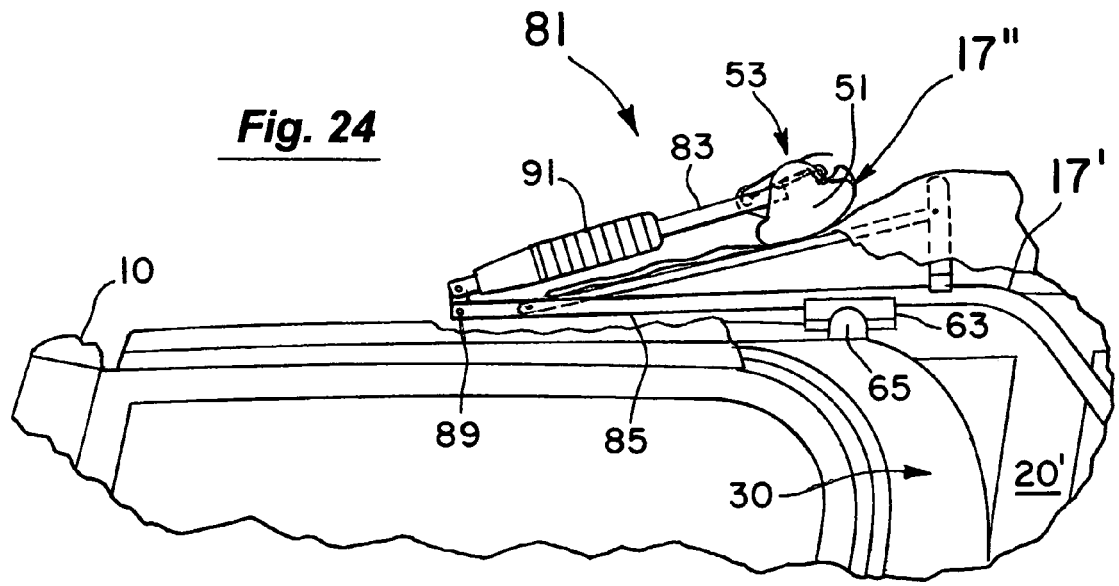
FIG. 24 is a view similar to FIG. 20 with the sunroof portion pivoted to its open position.

Referring again to FIG. 20, the convertible soft top 1 of the present invention preferably includes a pivoting sunroof portion 81. In operation and with the sunroof portion 81 in the closed position of FIG. 20, the segments 83 and 85 of the section 31 of the side leg 17' of the front bow member 17 extend substantially horizontally along a common longitudinal axis 87 (FIG. 21). The segments 83,85 of each side leg 17' are pivotally mounted to each other for relative movement about the axis 89. In this manner, the first segment 83 and the attached base 17" of the front bow member 17 can be moved to the open position of FIG. 24. In the open position of FIG. 24, the base 17" and the first segment 83 are then adjacent the second segment 85 to create an open portion in the soft top adjacent the windshield 10.

Figure 22:
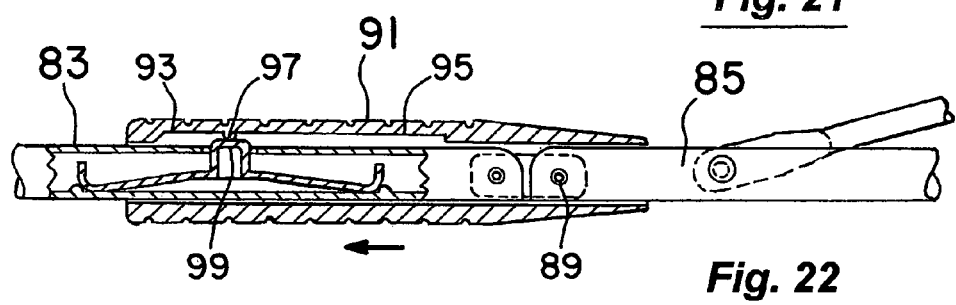

In the preferred embodiment, a sleeve member 91 (see FIGS. 20 and 21) is mounted about the first segment 83 for sliding movement along the axis 87 (FIG. 21). In the position of FIGS. 20 and 21 covering the pivotal axis 89, the sleeve member 91 serves to maintain the segments 83,85 in the aligned relationship of FIGS. 20 and 21 and the sunroof portion 81 closed. In operation, the sleeve member 91 can be slid along the axis 87 past the position of FIG. 22 to the position of FIG. 23 uncovering the pivotal axis 89. This in turn permits the base 17" of FIG. 20 and the first segment 83 to be pivoted relatively to the second segment 85 to the open position of FIG. 24. In doing so, the sleeve member 91 is provided with side-by-side recessed portions 93 and 95 (FIG. 21) along the axis 87 separated by the protruding member 97. Additionally, a detent 99 is mounted on the first segment 83. The detent 99 is spring biased outwardly through a hole in the segment 83 to an extended position (FIG. 21) and is selectively receivable in the recessed portions 93,95 as the sleeve member 91 is slid along the axis 87 from FIG. 21 to FIG. 23.

Figure 23:
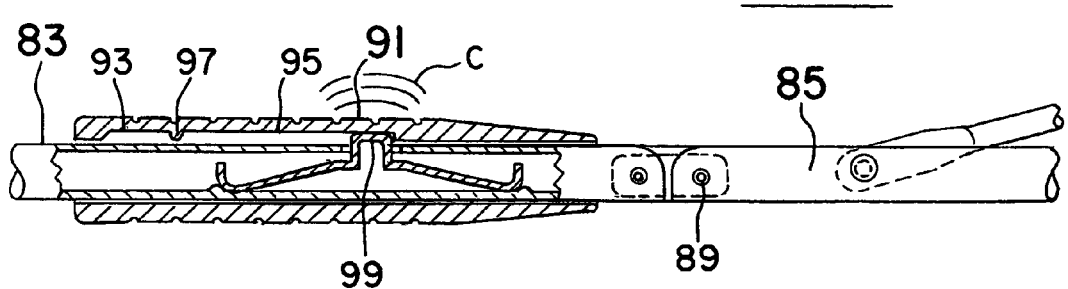

During such sliding, the protruding member 97 of the sleeve member 91 will contact and move or depress the detent 99 (FIG. 22) to a retracted position allowing the protruding member 97 to pass by the detent 99. In this manner, the depressed detent 99 will then rebound or snap back and be received in the other recessed portion 95 (FIG. 23). Such rebounding can be tactually felt by the user. It can also be heard by the user as the rebounding detent 99 makes an audible click C. In moving the sleeve member 91 to lock the segments 83,85 in the aligned relationship of FIGS. 20 and 21, the tactile feel and audible click C each act as a signal to let the user know the locked position has been reached. In this locked position, the sunroof portion 81 will not inadvertently move or open unless and until the sleeve member 91 is slid to the position of FIG. 23 to again uncover the pivotal axis 89. This arrangement with the locking or interfering mechanism of the detent 99 and recessed portion 93 bounded by the protruding member 97 essentially serves as a safety feature. Preferably, each side leg 17' is provided with such an arrangement. Also, it is noted that in the open position of FIG. 24, the engagement of the block member 63 and the U-shaped member 65 on the door frame 30 further helps to ensure the front bow member 17 remains securely in place even with the sunroof portion 81 open as in FIG. 24.

Figure 25:
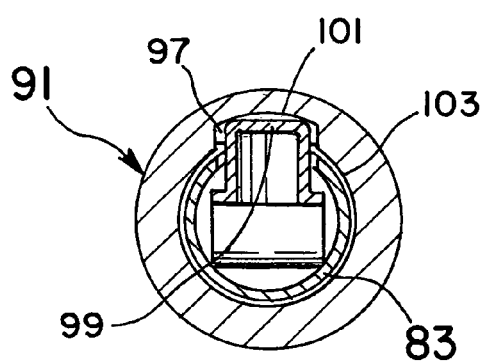
FIG. 25 is an enlarged view taken along line 25—25 of FIG. 21.

The recessed portions 93,95 are preferably made as a relatively narrow channel 101 (see FIG. 25) in the inner wall 103 of the sleeve member 91. The detent 99 is then preferably always confined within the channel 101 to keep the sleeve member 91 from rotating about the axis 87. The protruding member 97 in this regard is preferably shallower than the channel 101 (see FIG. 25) so the spring biased detent 99 will still remain in the channel 101 even in the depressed or retracted position of FIG. 22.

Figure 26:
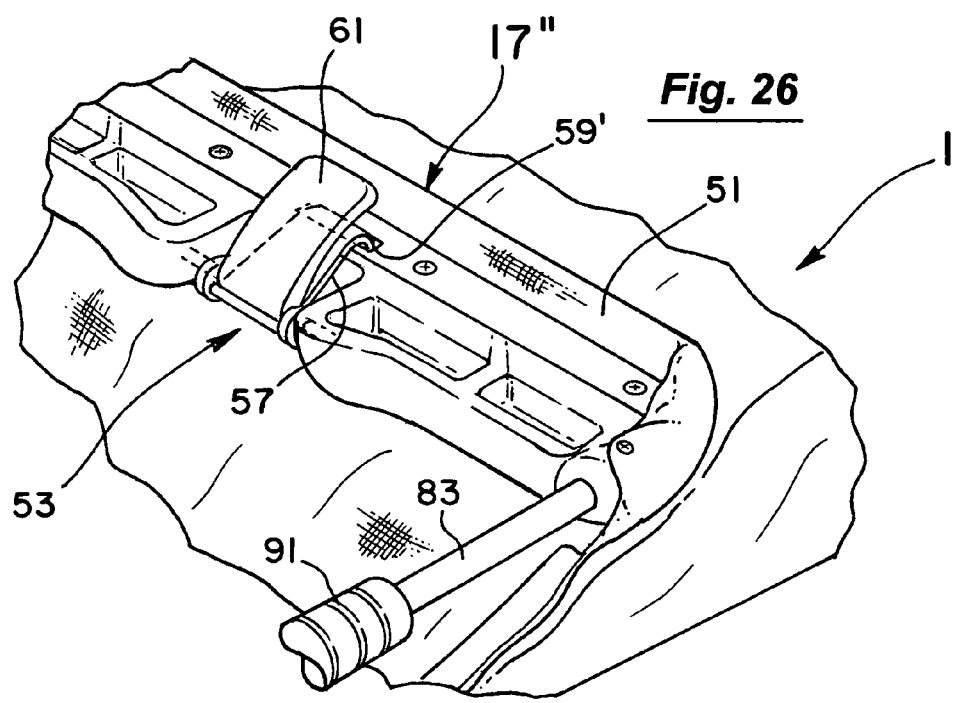
FIG. 26 is a perspective view of FIG. 25 showing how each clamp assembly can be secured to the header of the front bow member when the sunroof portion is in its open position.

FIG. 26 illustrates a further feature of the convertible soft top 1 of the present invention in which a recess 59' is provided in the underside of the header section 51 of the base 17" of the front bow member 17. In this manner and with the sunroof portion 81 in the open position of FIGS. 24 and 26, the hook member 57 of the clamp assembly 53 can be received in the recess 59' and the clamp handle 61 moved to lock the clamp assembly 53 in a fixed position relative to the header section 51. Consequently, the clamp assembly 53 will not be loose to rattle or hang down into the area 16 of the driver and front passenger. This is both a safety feature and a way to keep the clamp assembly 53 from making unwanted noise when the sunroof portion 81 is open.

While several embodiments of the present invention have been shown and described in detail, it to be understood that various changes and modifications could be made without departing from the scope of the invention.

We claim:

1. A convertible soft top for a vehicle, the vehicle having a body with front and rear portions spaced from each other along a longitudinal axis, said front portion having an upstanding windshield and said rear portion having side panels and a rearward panel, said vehicle further having a safety bar arrangement with a portion thereof having an inverted, substantially U-shape with the side legs of said inverted U-shape extending substantially vertically upward from the vehicle body adjacent the rear portion thereof and the base of the inverted U-shape extending between the side legs substantially horizontally across the vehicle body and the longitudinal axis adjacent the rear portion of the vehicle body, said convertible soft top including:

a foldable, collapsible frame and a flexible fabric attached thereto, said frame including at least front and rear bow members, each bow member having an inverted, substantially U-shape with side legs and a base extending substantially horizontally between the side legs, the side legs of the rear bow member being respectively mounted to the side legs of said safety bar portion for pivotal movement relative thereto about a first, fixed pivotal axis between a collapsed portion with said base adjacent the rearward panel and a raised portion with said base spaced from and above said rearward panel, and the side legs of said front bow member being respectively mounted to the side legs of said rear bow member for pivotal movement relative to said safety bar portion and said rear bow member about a second pivotal axis, said second pivotal axis being substantially parallel to and spaced from said first, fixed pivotal axis, the side legs of said front bow member being movable with the respective side legs of said rear bow member about the first, fixed pivotal axis, said front bow member further being movable between a collapsed position with the base of the inverted U-shape thereof adjacent the rearward panel and the collapsed position of the base of the rear bow member and a raised position with the base of the front bow member adjacent the windshield of the front portion of the vehicle body.

2. The convertible soft top of claim 1 wherein said second pivotal axis is fixed relative to the respective side legs of said rear bow member.

3. The convertible soft top of claim 1 wherein the respective side legs of said front bow member are substantially L-shaped.

4. The convertible soft top of claim 3 wherein the respective side legs of said rear bow member have a portion substantially matching the L-shape of the side legs of the front bow member wherein the L-shaped side legs of the front bow member and the L-shaped portion of the side legs of the rear bow member are substantially aligned and adjacent one another in the respective collapsed positions of the front and rear bow members.

5. The convertible soft top of claim 4 wherein each L-shaped side leg of the front bow member has sections extending along respective axes and said axes intersect one another at an angle greater than 90 degrees.

6. The convertible soft top of claim 5 wherein said angle is about 120 degrees.

7. The convertible soft top of claim 3 wherein each L-shaped side leg of the front bow member has sections extending along respective axes and said axes intersect one another at an angle greater than 90 degrees.

8. The convertible soft top of claim 7 wherein said angle is about 120 degrees.

9. The convertible soft top of claim 1 wherein said frame further includes an additional bow member having an inverted, substantially U-shape with side legs and a base extending substantially horizontally between said side legs, the side legs of said additional bow member being respectively mounted to the side legs of the rear bow member for pivotal movement about a third pivotal axis, said third pivotal axis being substantially parallel to said first and second pivotal axes and being positioned along the respective side legs of said rear bow member substantially between said second axis and the base of said rear bow member, said additional bow member being movable about said third pivotal axis between a collapsed position with the base of the inverted U-shape thereof adjacent the base of the collapsed rear bow member and a raised position with the base of the additional bow member spaced from the base of the raised rear bow member toward the front portion of the vehicle body.

10. The convertible soft top of claim 1 wherein the respective side legs of said front bow member are substantially L-shaped and the vehicle has a door frame between the front and rear portions of the vehicle body and said door frame has a substantially horizontal, upper section extending substantially rearwardly from adjacent said windshield and wherein at least one section of the L-shape of at least one of the side legs of the front bow member is releasably securable to the door frame with the one section of the side leg substantially aligned with the horizontal upper section of the door frame.

11. The convertible soft top of claim 10 wherein the base of the inverted U-shape of the front bow member is releasably securable to the windshield.

12. The convertible soft top of claim 1 wherein said vehicle further includes a door frame and said convertible soft top further includes an arrangement for automatically securing at least one said side leg of the front bow member to said door frame as said front bow member is moved between said collapsed and raised positions.

13. The convertible soft top of claim 1 wherein the base of the inverted U-shape of the front bow member is releasably securable to the windshield.

14. The convertible soft top of claim 13 wherein the base of the inverted U-shape of the front bow member includes a header section and at least one clamp assembly pivotally mounted to said header section and releasably securable to the windshield.

15. The convertible soft top of claim 1 wherein each of the respective side legs of the front bow member in said raised position has a section extending substantially horizontally and each section has first and second segments, said first segment being mounted to the base of the front bow member and being attached to the second segment of the respective side leg for pivotal movement about a third axis, said base being selectively pivotable about said third pivotal axis between a closed position with the base of the front bow member substantially adjacent the windshield and an open position with said base spaced from said windshield and adjacent the second segments of the side legs to create an open portion in said soft top adjacent the windshield.

16. The convertible soft top of claim 15 wherein the vehicle has a door frame and wherein the second segment of at least one of said side legs of the front bow member is releasably securable to the door frame.

17. The convertible soft top of claim 16 wherein said first and second segments extend substantially in an aligned relationship along a common longitudinal axis in the closed position of the base of the front bow member and said convertible soft top further includes an arrangement to selectively maintain said first and second segments in said aligned relationship.

18. The convertible soft top of claim 17 wherein said arrangement includes a sleeve member mounted for sliding movement along said longitudinal axis between a covering position covering the third pivotal axis and maintaining said first and second segments in said aligned relationship and an uncovering position uncovering the third pivotal axis to permit the base of said front bow member to be pivoted about the third axis relative to said second segment to said open position.

19. The convertible soft top of claim 18 wherein said arrangement further includes a mechanism for releasably locking said sleeve member in said covering position.

20. The convertible soft top of claim 15 wherein said first and second segments extend substantially along a common longitudinal axis in the closed position of the base of the front bow member and said convertible soft top further includes a locking mechanism for releasably locking said first and second segments in an aligned relationship with said front bow member in said raised and collapsed positions.

21. The convertible soft top of claim 15 wherein the base of the inverted U-shape of the front bow member includes a header section and at least one clamp assembly pivotally mounted to said header section and releasably securable to the windshield.

22. The convertible soft top of claim 21 wherein said pivotally mounted clamp assembly is releasably securable to said header section in a fixed position relative thereto with said base of said front bow member in said open position.

23. The convertible soft top of claim 22 wherein said windshield and said header section respectively include a recess therein and said clamp assembly includes a hook member selectively receivable in the recess in said windshield and the recess in said header section.

24. A convertible soft top for a vehicle, the vehicle having a body with front and rear portions spaced from each other along a longitudinal axis, said front portion having an upstanding windshield and said rear portion having side panels and a rearward panel, said convertible soft top including:

a foldable, collapsible frame and a flexible fabric attached thereto, said frame including at least a front bow member having an inverted, substantially U-shape with side legs and a base extending substantially horizontally between the side legs, the side legs of the front bow member being mounted for pivotal movement relative to said vehicle about a first axis between a collapsed position with the base thereof adjacent the rearward panel and a raised position with said base adjacent the windshield of the front portion of the vehicle body, and said vehicle further includes a door frame and said convertible soft top further includes an arrangement for automatically securing at least one said side leg of the front bow member to said door frame as said front bow member is moved between said collapsed and raised positions.

25. The convertible soft top of claim 24 wherein said securing arrangement includes a block member mounted on said one side leg of the front bow member and a receiving member with two upstanding legs spaced from one another mounted on said door frame to receive said block member between said upstanding legs.

26. The convertible soft top of claim 25 wherein said block member includes a beveled surface aligned to selectively contact one of said upstanding legs of said receiving member as said front bow member is moved between said collapsed and raised positions to guide the block member between the upstanding legs of said receiving member.

27. The convertible soft top of claim 25 wherein said receiving member includes a retractable plunger with an end portion, said plunger being mounted to one said upstanding leg of said receiving member, said block member having a recess to selectively receive an end portion of said plunger to secure said block member and said at least one side leg of the front bow member to said door frame.

28. The convertible soft top of claim 27 further including a spring to bias said plunger to extend the end portion thereof through said one upstanding leg of the receiving member to a first position, said block member including a beveled surface adjacent said recess, said beveled surface being aligned to contact the end portion of said plunger as said front bow member is moved between said collapsed and raised positions to retract the end portion of the plunger from said first position against the force of the spring biasing the plunger toward said first position, said plunger moving to said first position under the force of the spring upon alignment of the end portion thereof with the recess in said block member.

29. The convertible soft top of claim 28 wherein said block member further includes a surface with an inverted, substantially V-shape adjacent said beveled surface to selectively contact and aid in guiding the end portion of said plunger into alignment with the recess of said block member as said front bow member is moved between said collapsed and raised positions.

30. A convertible soft top for a vehicle, the vehicle having a body with front and rear portions spaced from each other along a longitudinal axis, said front portion having an upstanding windshield and said rear portion having side panels and a rearward panel, said convertible soft top including:

a foldable, collapsible frame and a flexible fabric attached thereto, said frame including at least a front bow member having an inverted, substantially U-shape with side legs and a base extending substantially horizontally between the side legs, the side legs of the front bow member being mounted for pivotal movement relative to said vehicle about a first axis between a collapsed position with the base thereof adjacent the rearward panel and a raised position with said base adjacent the windshield of the front portion of the vehicle body, and the base of the inverted U-shape of the front bow member including a header section and at least one clamp assembly pivotally mounted to said header section and releasably securable to the windshield, said pivotally mounted clamp assembly further being releasably securable to said header section in a fixed position relative thereto.

31. The convertible soft top of claim 30 wherein each of the respective side legs of the front bow member in said raised position has a section extending substantially horizontally and each section has first and second segments, said first segment being mounted to the base of the front bow member and being attached to the second segment of the respective side leg for pivotal movement about a second axis, said base being selectively pivotable about said second pivotal axis between a closed position with the base of the front bow member substantially adjacent the windshield and an open position with said base spaced from said windshield and adjacent the second segments of the side legs to create an open portion in said soft top adjacent the windshield, said clamp assembly being selectively securable to said windshield with said base in said closed position and to the header section of said base with said base in said open position.

32. The convertible soft top of claim 31 wherein the vehicle has a door frame and wherein the second segment of at least one of said side legs of the front bow member is releasably securable to the door frame.

33. The convertible soft top of claim 31 wherein said first and second segments extend substantially along a common longitudinal axis in the closed position of the base of the front bow member and said convertible soft top further includes a mechanism for releasably locking said first and second segments in said aligned relationship with said front bow member in said raised and collapsed positions.

34. A soft top for a vehicle, the vehicle having a body with front and rear portions spaced from each other along a longitudinal axis, said front portion having an upstanding windshield, said soft top including:

a frame and a flexible fabric attached thereto, said frame including at least a front bow member with side legs and a base extending substantially horizontally between the side legs and the base of the front bow member including a header section and at least one clamp assembly pivotally mounted to said header section and releasably securable to the windshield, said pivotally mounted clamp assembly further being releasably securable to said header section in a fixed position relative thereto wherein each of the respective side legs of the front bow member has a section extending substantially horizontally and each section has first and second segments, said first segment being mounted to the base of the front bow member and being attached to the second segment of the respective side leg for pivotal movement about a second axis, said base being selectively pivotable about said second pivotal axis between a closed position with the base of the front bow member substantially adjacent the windshield and an open position with said base spaced from said windshield and adjacent the second segments of the side legs to create an open portion in said soft top adjacent the windshield, said clamp assembly being selectively securable to said windshield with said base in said closed position and to the header section of said base with said base in said open position.

35. The soft top of claim 34 wherein said windshield and said header section respectively include a recess therein and said clamp assembly includes a hook member selectively receivable in the recess in said windshield and the recess in said header section.

36. The soft top of claim 34 wherein said first and second segments extend substantially in an aligned relationship along a common longitudinal axis in the closed position of the base of the front bow member and said convertible soft top further includes an arrangement to selectively maintain said first and second segments in said aligned relationship.

37. The soft top of claim 36 wherein said arrangement includes a sleeve member mounted for sliding movement along said longitudinal axis between a covering position covering the second pivotal axis and maintaining said first and second segments in said aligned relationship and an uncovering position uncovering the second pivotal axis to permit the base of said front bow member to be pivoted about the second axis relative to said second segment to said open position.

38. The soft top of claim 37 wherein said arrangement further includes a mechanism for releasably locking said sleeve member in said covering position.

39. The soft top of claim 34 wherein the rear portion of said vehicle body has side panels and a rearward panel and the side legs of the front bow member are mounted for pivotal movement relative to said vehicle about a first axis between a collapsed position with the base thereof adjacent the rearward panel and a raised position with said base adjacent the windshield of the front portion of the vehicle body.

40. A soft top for a vehicle, the vehicle having a body with front and rear portions spaced from each other along a longitudinal axis, said front portion having an upstanding windshield, said soft top including:
a frame and a flexible fabric attached thereto, said frame including at least a front bow member with side legs and a base extending substantially horizontally between the side legs, each of said side legs of the front bow member having a section extending substantially horizontally with each section having first and second segments, said first segment being mounted to the base of the front bow member and being attached to the second segment of the respective side leg for pivotal movement about a pivotal axis, said base and said first segments being selectively pivotable about said pivotal axis between a closed position with the base of the front bow member substantially adjacent the windshield and an open position with said base spaced from said windshield and adjacent the second segments of the side legs to create an open portion in said soft top adjacent the windshield, and
said first and second segments extend along a common longitudinal axis in the closed position of the base of the front bow member and said soft top further includes an arrangement having a locking mechanism for releasably locking said first and second segments in an aligned relationship.

41. The soft top of claim 40 wherein said arrangement further includes a sleeve member mounted about at least one of the first and second segments for sliding movement relative thereto along said common longitudinal axis with the first and second segments in said closed position, said sleeve member including a recessed portion and said locking mechanism including a detent selectively receivable in said recessed portion.

42. The soft top of claim 41 wherein said detent is mounted on one of said segments.

43. The soft top of claim 41 wherein said arrangement includes a spring member biasing said detent toward an extended position receivable in said recessed portion.

44. The soft top of claim 41 wherein said detent creates a signal as the detent is received in said recessed portion.

45. The soft top of claim 40 wherein said arrangement includes a sleeve member mounted for sliding movement along a longitudinal axis between a covering position covering the pivotal axis and maintaining said first and second segments in an aligned relationship and an uncovering position uncovering the pivotal axis to permit the base of said front bow member to be pivoted about the second axis relative to said second segment to said open position and said locking mechanism releasably locks said sleeve member in said covering position.

46. The soft top of claim 45 wherein said sleeve member includes first and second recessed portions spaced from each other, said recessed portions being separated by a protruding member, said locking mechanism including a detent selectively receivable in said first and second recessed portions, said detent being mounted on one of said segments, said arrangement including a spring member biasing said detent away from a retracted position and toward an extended position selectively receivable in said recessed portions, said detent being received in said first recessed portion to lock said sleeve member in said covering position wherein movement of said sleeve member along said longitudinal axis between said covering and uncovering positions will cause said protruding member to contact and move said detent to said retracted position allowing said protruding member to pass by said detent and said detent to be received in said second recessed portion.

47. The soft top of claim 40 wherein the rear portion of said vehicle body has side panels and a rearward panel and the side legs of the front bow member are mounted for pivotal movement relative to said vehicle between a collapsed position with the base thereof adjacent the rearward panel and a raised position with said base adjacent the windshield of the front portion of the vehicle body.

48. A convertible soft top for a vehicle, the vehicle having a body with front and rear portions spaced from each other along a longitudinal axis, said rear portion having side panels and a rearward panel, said vehicle further having a safety bar arrangement with a portion thereof having an inverted, substantially U-shape with the side legs of said inverted U-shape extending substantially vertically upward from the vehicle body adjacent the rear portion thereof and the base of the inverted U-shape extending between the side legs substantially horizontally across the vehicle body and the longitudinal axis adjacent the rear portion of the vehicle body, said convertible soft top including:
a foldable, collapsible frame and a flexible fabric attached thereto, said frame including at least a rear bow member having an inverted, substantially U-shape with side legs and a base extending substantially horizontally between the side legs, the side legs of the rear bow member being respectively mounted to the side legs of said safety bar portion for pivotal movement relative thereto about a first, fixed pivotal axis between a collapsed portion with said base adjacent the rearward panel and a raised portion with said base spaced from and above said rearward panel, and
wherein said frame further includes an additional bow member having an inverted, substantially U-shape with side legs and a base extending substantially horizontally between said side legs, the side legs of said additional bow member being respectively mounted to the side legs of the rear bow member for pivotal movement about a second pivotal axis, said second pivotal axis being substantially parallel to said first pivotal axis and being positioned along the respective side legs of said rear bow member substantially between said first axis and the base of said rear bow member, said additional bow member being movable about said second pivotal axis between a collapsed position with the base of the inverted U-shape thereof adjacent the base of the collapsed rear bow member and a raised position with the base of the additional bow member spaced from the base of the raised rear bow member toward the front portion of the vehicle body.

* * * * *